United States Patent [19]
Luetkens, Jr. et al.

[11] Patent Number: 5,128,196
[45] Date of Patent: Jul. 7, 1992

[54] FOAMED CORE-RECLAIM MULTI-LAYER SHEET AND PROCESS FOR PRODUCTION THEREOF

[75] Inventors: Melvin L. Luetkens, Jr., Batavia, Ill.; Robert D. Pischke, Duluth; John C. Schubert, Marietta, both of Ga.

[73] Assignee: Amoco Corporation, Chicago, Ill.

[21] Appl. No.: 495,279

[22] Filed: Mar. 16, 1990

[51] Int. Cl.$^5$ ................................. B32B 3/26
[52] U.S. Cl. ................... 428/213; 428/317.1; 428/318.6; 428/319.3; 428/319.7
[58] Field of Search .......... 428/213, 317.1, 317.7, 428/318.6, 319.3, 319.7

[56] References Cited

U.S. PATENT DOCUMENTS 3,206,354  9/1965  Pooley ..................... 428/318.6
4,128,695 12/1978  Kikuchi et al. ............. 428/319.7

Primary Examiner—William J. Van Balen
Attorney, Agent, or Firm—William E. Murray; William H. Magidson; Frank J. Sroka

[57] ABSTRACT

The invention comprises a multi-layer thermoplastic foam sheet comprising a thermoplastic foam layer adjacent to at least one multi-resin layer, preferably comprising a reclaim material mixture recycled from the sheet manufacturing process, and which comprises a thermoplastic barrier resin. In a preferred embodiment, the multi-layer sheet of the invention comprises a four major layer sheet comprising a barrier film layer which comprises a thermoplastic oxygen barrier resin; an inner mutli-resin reclaim layer comprising the oxygen barrier resin used in the barrier film layer; a foam core layer adjacent to the inner multi-resin reclaim layer; and an outer multi-resin reclaim layer, also comprising the oxygen barrier resin, as the other outer layer of the multi-layer sheet. In a more preferred embodiment, impact polystyrene is added to the reclaim layers and polystyrene is used in the foam core to produce multi-layer sheets having an impact-resisting outer layer and a lightweight inner foam core layer, respectively.

24 Claims, 1 Drawing Sheet

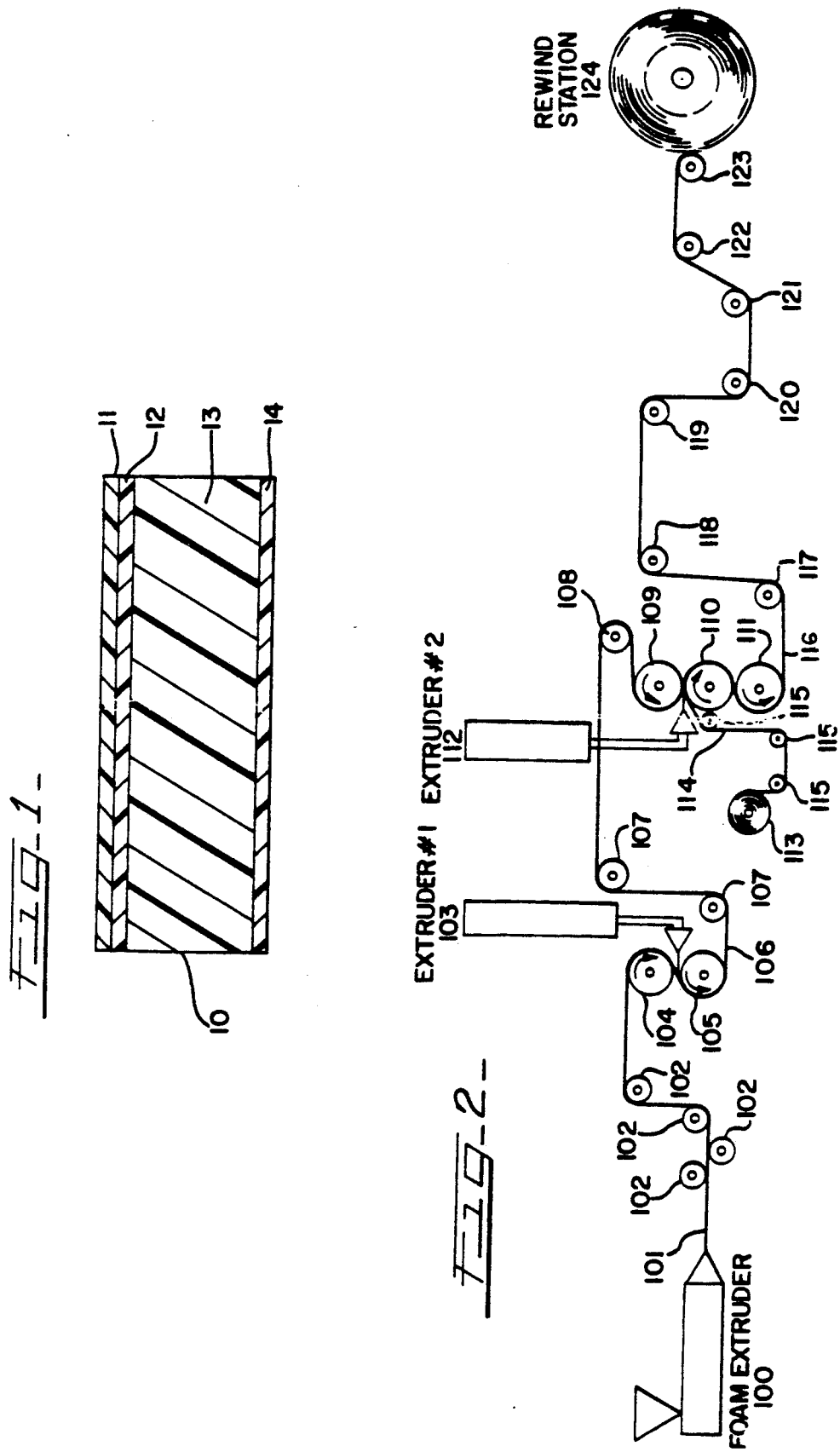

FOAMED CORE-RECLAIM MULTI-LAYER SHEET AND PROCESS FOR PRODUCTION THEREOF

BACKGROUND OF THE INVENTION

This invention relates to a thermoplastic multi-layer sheet used for production of packaging materials and, more particularly, relates to a thermoplastic multi-layer sheet having a foam core layer and a multi-resin layer preferably made with waste materials reclaimed from the multi-layer sheet manufacturing process.

Thermoplastic foam sheet materials, such as those made from polystyrene foam, have been used for packaging applications. These foamed sheet materials are typically made by extrusion using a blowing agent wherein polystyrene resin, for example, is heated in an extruder and is mixed in the extruder with a gaseous or volatile blowing agent and then extruded through a die and allowed to expand to form a polystyrene foam sheet. These foam sheets can be extrusion coated, for example, by the process described in U.S. Pat. No. 3,616,020 or U.S. Pat. No. 3,669,794, to add a coating or coatings to produce multi-layered foam sheets. White, U.S. Pat. No. 3,396,062, discloses a process for molding a composite foam article.

Multi-layer sheets made with various thermoplastic polymers have also been used extensively in packaging applications. Typically, these multi-layer sheets are produced by coextrusion of various plastic resins. In such multi-layer sheets, layers comprising a thermoplastic resin having oxygen barrier properties have been added to provide improved properties to the sheet. Peterson, U.S. Pat. No. 3,524,795, teaches a multi-layer packaging material employing polyolefin outer layers with an inner layer of saran which functions as an oxygen barrier layer. Other multi-layer sheets have used other resins, such as an ethylene vinyl alcohol copolymer or a polyamide, as the oxygen barrier resin. For example, Schirmer, U.S. Pat. No. 4,848,187, discloses a multi-layer sheet having a polypropylene or polyethylene outer layer, an ethylene vinyl alcohol copolymer ("EVOH") or vinylidene chloride copolymer oxygen barrier layer, an unsaturated vinyl ester bonding layer for adhesion to polystyrene, and an outer layer of polystyrene, foamed or unfoamed, adjacent the bonding layer. Nakabayashi, U.S. Pat. No. 4,576,995, discloses a multi-layer sheet with an EVOH oxygen barrier resin layer laminated between polystyrene outer layers with adhesive layers of a modified ethylene vinyl acetate copolymer. Japanese Patent Application 84012467, published Mar. 23, 1984, discloses a container made from a multi-layer structure comprising an outer polyethylene layer, an EVOH oxygen barrier resin layer, and an outer layer of one of polypropylene, nylons, polyesters, polycarbonates, polystyrenes and polyvinyl chlorides.

The production and use of these multi-layer materials often result in considerable amounts of scrap material being formed during the manufacturing operations. Accordingly, much effort has been directed towards the recycle of scrap material produced during the production of thermoplastic multi-layer sheets. However, scrap from these multi-layer materials is difficult to recycle because of the different thermoplastic compositions contained in the various layers. The different thermoplastics used often are incompatible with each other, resulting in the mixture of such thermoplastics having poor mechanical properties, such as impact strength, tensile strength, heat deflection temperature and elongation at break. For example, ethylene vinyl alcohol copolymer and polystyrene are immiscible, making recycle of scrap containing these two thermoplastics difficult.

One approach to avoid the incompatibility problem of thermoplastics contained in scrap is to blend a compatibilizer, such as a styrene-ethylene-co-butylene-styrene block copolymer like Kraton sold by Shell, with the scrap mixture. A compatibilizer, however, may not be available for the thermoplastics used. See The International Packaging Letter, Vol. 6, Number 516, May/June 1989 at p. 2, which states that three commercially available compatibilizers did not work for polystyrene and ethylene vinyl alcohol copolymer scrap.

Haefner, U.S. Pat. No. 3,940,001, and Schenk, U.S. Pat. No. 3,977,153, each disclose recycling of multi-layer structures wherein the individual layers are first separated to produce single component materials. This approach is difficult for structures having many layers and requires identification of what is in each layer.

Wallace, U.S. Pat. No. 4,647,509, describes a multi-layer laminate structure having a layer made of scrap from the multi-layer structure manufacturing process and a barrier layer, wherein the scrap layer is a blend of the scrap material produced during the manufacturing process with a quantity of an unused, or virgin, resin which makes up one of the other layers of the structure. Wallace does not disclose foam multi-layer sheets having a thermoplastic foam layer with an adjacent multi-resin reclaim layer.

An example of a compatibilizer approach for recycling multi-layer sheets is Catte, U.S. Pat. No. 4,234,663, which describes a multi-layer foil structure which comprises a thermoplastic styrenic polymer layer and a thermoplastic olefin polymer layer bonded by an intermediary polymer layer comprising at least one layer comprising a bonding agent wherein at least one layer containing scrap produced from the multi-layer foil structure is included intermediate of the styrenic polymer and olefinic polymer layers and the scrap containing layer comprises a mixture of scrap with a graft copolymer compatibilizer in a ratio of graft copolymer to scrap of 0.2:1 to 9:1. The graft copolymer compatibilizer is described further as being a polyolefin substrate with a styrene or styrenic monomer grafted onto the polyolefin. The structures of Catte are disclosed as manufactured by a coextrusion process or by extrusion coating. Catte does not disclose foam multi-layer sheets having a thermoplastic foam layer with an adjacent multi-resin layer, nor does he disclose recycling of multi-layer sheets comprising an oxygen barrier resin. He also does not disclose a multi-resin layer comprising an oxygen barrier resin. Further, he uses the graft copolymer compatibilizer in his reclaim layer.

Bonis, U.S. Pat. No. 4,402,889, describes a process to produce a multi-layer plastic sheet comprising outer layers of "qualified" scrap material, defined as either unused virgin resin or a scrap material consisting of only one resin, and a central layer of "unqualified" scrap material having a sufficient polyolefin content to provide a moisture barrier. Bonis uses a coextrusion process wherein separate streams of the qualified scrap material and the unqualified scrap material are coextruded together through the same die to produce the multi-layer sheet.

Hungerford, U.S. Pat. No. 4,287,147, describes a process for reusing scrap material resulting from the production of a laminated film made from a polyacrylonitrile homopolymer or interpolymers. This process involves redissolving the scrap in a solvent for reuse.

Benge, U.S. Pat. No. 4,652,325, describes a method for making a multi-layer plastic structure having a substantial asymmetry in the layers of the structure, which comprises two separate coextrusions to produce two multi-layer sheets followed by combination of the two sheets to produce the structure. The two sheets are combined by being brought into contact with each other at a time when at least one contact surface of one of the sheets is still in a fluid state. In the Benge method, reclaim material is used in the coextrusion steps to produce a layer in one of the sheets. Benge, U.S. Pat. No. 4,808,482, is a division of U.S. Pat. No. 4,652,325, and is directed to an asymmetrical multi-layer structure produced by the process of U.S. Pat. No. 4,652,325. The structure is disclosed as having at least six layers: two skin polymer layers surrounding a barrier resin layer which makes up one of the sheets and two additional skin polymer layers surrounding a reclaim material layer which make up the second sheet.

Kamoda, U.S. Pat. No. 4,410,602, describes a process for producing a multi-layer laminated resin film using reclaimed resin mixture in a coextrusion process wherein a layer of the reclaimed resin mixture is entirely surrounded by a fresh resin layer. In Kamoda, the reclaimed synthetic resin mixture surrounded by fresh resin layers is used as a top and bottom laminate with an interlayer interposed between these two laminates. The fresh resin used by Kamoda is disclosed as having a decomposition temperature higher than that of the reclaim resin mixture.

Briggs, U.S. Pat. No. 4,705,708, describes a multi-layer laminate structure having a separate layer of scrap produced from several thermoplastic resins used in making the laminate structure, which is used to produce parisons for blow-molding applications.

Canadian Patent 996,018 discloses a reprocessible multi-layer laminate for food containers comprising a blend of high-density polyethylene, ethylene copolymer adhesives and polyamides wherein one layer consists of a melt homogeneous blend of polyethylene and scrap from the reprocessible laminate.

Brinkman, U.S. Pat. No. 4,013,745, describes a polyvinyl glass film extrusion process involving use of recycle material wherein the recycle material is returned to the extruder feed.

Thiel, U.S. Pat. No. 4,086,045, describes apparatus for producing thin-walled articles comprising extrusion to produce a web of thermoplastic material. Residue from the overall process is fed back to the extrusion stage where it is mixed with fresh raw material.

An Eval Company of America (EVALCA) technical information bulletin entitled "Technical Information on GF-20" (precise publication date is unknown, but a copy was obtained by Applicants in April, 1989), states that scrap material containing EVOH has been used in multi-layer structures and discloses a method to avoid processing anomalies during extrusion of reclaim containing polypropylene and EVOH, which comprises addition of GF-20, an additive sold by EVALCA.

Reclaim material consisting of polystyrene, impact polystyrene and non-thermoplastic printing inks has been mixed in small amounts with fresh impact polystyrene and used in the extrusion coating of an impact polystyrene layer on a polystyrene foam core. The same reclaim material has also been mixed in small amounts with fresh polystyrene and used in conventional extrusion of a polystyrene foam. This reclaim material does not comprise a thermoplastic oxygen barrier resin or polyolefin.

None of the previously disclosed uses of thermoplastic reclaim material in the production of multi-layer structures have used a multi-resin layer comprising an oxygen barrier resin as an outer layer. None of the previously disclosed processes have involved extrusion coating of a thin layer of multi-resin material comprising an oxygen barrier resin onto a foam core layer. None of the prior art processes or structures have involved the combination of an oxygen barrier film as one outer layer with a foam core layer and a second outer layer comprising multi-resin material. Further, none have addressed recycle of a mixture of polystyrene, polyolefin and an EVOH oxygen barrier resin.

It is accordingly an object of this invention to provide an improved thermoplastic multi-layer structure comprising a thermoplastic foam core layer, particularly a polystyrene foam core layer. It is another object of this invention to provide a thermoplastic multi-layer sheet capable of being processed into cups and trays or other packaging articles comprising a thermoplastic oxygen barrier layer laminated onto a foam core layer and at least one multi-resin layer comprising waste material reclaimed from the multi-layer sheet manufacturing process. It is yet another object to provide a recycle method for waste material comprising polystyrene, polyolefin and ethylene vinyl alcohol copolymer. Other objects will appear below.

We have found that the objects of the invention can be attained by a thermoplastic multi-layer sheet comprising a foam polystyrene layer and a multi-resin layer comprising a mixture of at least three thermoplastic components: a polystyrene, a polyolefin, and an ethylene vinyl alcohol copolymer. Such a multi-layer sheet is lightweight, strong, readily thermoformable into cups, containers and packages, and readily produced at commercially feasible rates.

SUMMARY OF THE INVENTION

The invention provides a thermoplastic multi-layer sheet useful for packaging applications comprising at least two layers: a thermoplastic foam layer and a multi-resin layer comprising a mixture of at least three resins, including an oxygen barrier resin selected from the group consisting of ethylene vinyl alcohol copolymers and polymers comprising a copolymer of acrylonitrile. Preferably, the foam layer comprises a styrenic resin and the multi-resin layer comprises a mixture of a styrenic resin, a polyolefin and an ethylene vinyl alcohol copolymer. More preferably, the multi-resin layer mixture of at least three resins has an elongation at break, measured before its fabrication into the multi-layer sheet, of at least about 2.6 percent, and is derived from waste thermoplastic material, such as that produced during manufacture of the multi-layer sheet of the invention.

The multi-layer sheet of the invention can also comprise additional layers. Thus, in another embodiment, the invention comprises a thermoplastic multi-layer sheet comprising at least three layers: a polystyrene foam core layer; an outer multi-resin layer adjacent the foam core layer comprising a mixture of at least polystyrene, a polyolefin and EVOH barrier resin, which is preferably reclaim material obtained from manufacture and processing of the sheet; and an oxygen barrier layer comprising the EVOH barrier resin. In a preferred embodiment, the multi-layer sheet of the invention comprises at least four layers: the polystyrene foam core layer; an outer layer of a thermoplastic polymer composition having impact resistance properties, such as impact polystyrene, adjacent a first surface of the foam core layer; an inner multi-resin layer comprising a mixture of polystyrene, a polyolefin and EVOH barrier resin, adjacent a second surface of the foam core layer; and an outer oxygen barrier layer comprising the EVOH barrier resin, adjacent the inner multi-resin layer, wherein the inner multi-resin layer is about 1.0 mil to about 7.0 mils thick. In another embodiment, the invention comprises a four layer sheet having the foam core layer, one outer multi-resin layer comprising a first multi-resin mixture, an inner multi-resin layer comprising a second multi-resin mixture, and a second outer layer comprising the EVOH barrier resin. Preferably, the first and second multi-resin mixtures are the same and contain an impact polystyrene.

The foam core multi-layer sheets of the invention can be further processed by suitable thermoforming operations to produce containers, cups or trays, for example. Preferably, such containers, cups or trays are used, in combination with a lidding or sealing material, for packaging applications.

The invention also comprises a method for producing the foam multi-layer sheet of the invention which comprises extrusion coating on at least one surface of a polystyrene foam core sheet, a first layer comprising a multi-resin mixture of at least a polystyrene resin, a polyolefin resin and an EVOH oxygen barrier resin to produce the multi-layer foam sheet. Preferably, the multi-resin mixture is thermoplastic reclaim material obtained from production of the multi-layer sheet and has an elongation at break, measured before its extrusion coating, of at least about 2.6 percent. The method of the invention preferably further comprises extrusion coating of a second inner layer comprising the same material as the multi-resin mixture in the first layer onto a second surface of the foam core sheet, and laminating an outer barrier layer comprising an oxygen barrier resin onto an outer surface of the second inner layer. Preferably, this method further comprises an initial foam extrusion step to produce the foam core sheet coupled to the subsequent addition of the other layers to provide a continuous production process.

In yet another embodiment of the method of the invention, reclaim material comprising at least three resins: a polystyrene, a polyolefin and an EVOH barrier resin, is blended with the foam resin to produce a feed mixture which is then foamed to produce the foam layer. In this embodiment, the reclaim material comprises about 1.0 to about 40.0 weight percent of the total feed to the foam extruder.

BRIEF DESCRIPTION OF THE DRAWINGS

FIG. 1 shows a side view of a multi-layer foam core sheet of the invention.

FIG. 2 shows a preferred process used to produce a preferred multi-layer sheet of the invention.

DESCRIPTION OF THE PREFERRED EMBODIMENTS

The invention broadly comprises a thermoplastic multi-layer sheet having a thermoplastic foam layer and at least one multi-resin layer. The multi-resin layer preferably comprises reclaim material obtained from the sheet manufacturing process and/or from the manufacturing process for making the sheet into end-use articles, such as packaging trays, and the thermoplastic foam preferably comprises a styrenic resin. The invention also comprises three and four layer sheets, all of which comprise the thermoplastic foam layer, the multi-resin layer, and an oxygen barrier layer comprising a barrier resin. (As used herein, the term "barrier resin" means a thermoplastic resin having oxygen barrier properties as discussed below.) In the three and four layer sheets of the invention, the thermoplastic foam layer is a foam core layer and the oxygen barrier layer is an outer layer of the sheet. In the three layer sheet the multi-resin layer is a second outer layer. In one embodiment of the four layer sheet of the invention, the multi-resin layer can be located as an inner layer in between the foam core layer and the oxygen barrier outer layer, and the second outer layer comprises an impact-resistant thermoplastic. In another embodiment, the four layer sheet comprises two multi-resin layers: one located as an inner layer in between the foam core layer and the outer oxygen barrier layer and the second located on the other side of the foam core layer as the second outer layer of the sheet. The multi-layer sheets of the invention can also comprise other layers, such as adhesive layers, in between the major layers of the sheets.

In a preferred embodiment, the multi-layer sheet of the invention comprises four major layers: a polystyrene foam core layer; an outer multi-resin layer and an inner multi-resin layer, each comprising thermoplastic material containing a polystyrene, a polyolefin and an EVOH barrier resin and each adjacent a separate surface of the foam core layer; and as the second outer layer, a barrier film layer comprising the EVOH barrier resin adjacent to the inner reclaim layer. FIG. 1 shows the preferred embodiment of the multi-layer sheet of the invention. Therein multi-layer sheet 10 is shown comprising four major layers. Outer multi-resin layer 14 comprises the thermoplastic reclaim material including the barrier resin. Foam layer 13 comprises preferably a styrenic foam such as polystyrene foam. Inner multi-resin layer 12 comprises preferably the same reclaim material as in outer multi-resin layer 14. The barrier layer 11 is the other outer layer of the multi-layer sheet and comprises preferably EVOH. Although not shown in FIG. 1, as discussed below, the barrier layer comprises preferably a multi-layer film to provide added properties to the barrier layer.

The foam core layer comprises preferably a styrenic foam produced using any technique sufficient to produce a stable foam from any foamable, heat-fusible styrenic resin. Techniques to produce stable foams from foamable styrenic resins, for example, by injection of a blowing agent into a polystyrene to produce an extrusion mass, which is then extruded through a die, are known to one skilled in the art. The styrenic resins useful in the foam core layer are polymers of alkenyl aromatic compounds having the general formula:

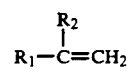

wherein $R_1$ represents an aromatic hydrocarbon radical, or an aromatic halohydrocarbon radical of the benzene or substituted benzene series, and $R_2$ is either hydrogen or the methyl radical. Resins which can be used as the styrenic foam core resin include such alkenyl aromatic compounds as the solid homopolymer styrene; alpha-methyl styrene; ortho-methyl styrene; meta-methyl styrene, para-methyl styrene; the solid copolymers of one or more of such alkenyl aromatic compounds with amounts of other polymerizable compounds such as methylmethacrylate, acrylonitrile, maleic anhydride, acrylic acid, and the like; impact polystyrene, which is a polystyrene modified by or containing elastomer moieties, such as styrene butadiene or polybutadiene; and blends of a styrenic resin such as polystyrene/poly(2,6-dimethylphenylene oxide). The choice of the foam resin will vary depending on the end-use application of the sheet of the invention. Preferably, the foam core layer of the invention is made with a polystyrene, because polystyrene is light weight, is relatively inexpensive and has sufficient temperature performance to be used in a wide variety of packaging applications.

The multi-layer sheet of the invention comprises the barrier layer made with a thermoplastic resin which has oxygen barrier properties. For packaging end-use applications, this resin is selected, in conjunction with the lidding material used in a particular package, to maintain a desired, modified atmosphere, such as, for example, a low oxygen content for meat packaging, within the package. In general, the resin used in the barrier layer has an oxygen permeability of about 10.0 or less as measured in cubic centimeters of $O_2$ permeation per mil of barrier layer thickness per 100 square inch of surface area of the barrier layer per day, measured at one atmosphere and 23° C. (hereinafter referred to as "$O_2$ permeation rate"). Preferably, the barrier resin has an $O_2$ permeation rate of about 5.0 or less, and more preferably about 1.0 or less. Preferably, the barrier resin also is processable without significant changes in the barrier resin's mechanical properties, processability or appearance at the temperatures used in extrusion coating of the particular reclaim, which generally are those from about 350° F. to about 500° F. for a polystyrene-containing reclaim. The barrier resin also must be capable, when admixed with at least two other thermoplastics such as polystyrene or polyolefins, of being extrusion coated or laminated into a thin layer without cracks onto the thermoplastic foam core. The barrier resin is selected from the group consisting of copolymers of ethylene and vinyl alcohol (referred to herein as EVOH) and polymers comprising a copolymer of acrylonitrile because EVOH and these polymers have sufficient oxygen barrier properties, yet can be recycled by extrusion coating in mixture with polystyrene and polyolefin without compatibilizers. Other oxygen barrier resins, such as saran (polyvinylidene chloride) were found by Applicants not to be recyclable in such a manner.

The polymers comprising a copolymer of acrylonitrile useful in the invention must have the oxygen barrier properties discussed above and include copolymers such as a copolymer of 70 weight percent acrylonitrile and 30 weight percent styrene and graft polymers comprising a copolymer of acrylonitrile and methylacrylate in any suitable proportion, grafted in any suitable proportions onto a butadiene elastomer. A suitable graft polymer available commercially, is sold as BAREX ® by The Standard Oil Company and is 90 weight percent of a copolymer of 74 weight percent acrylonitrile and 26 weight percent methylacrylate grafted onto 10 weight percent of butadiene rubber.

Preferably, the barrier resin is an EVOH because of their excellent oxygen barrier properties in thin films. EVOH can be produced by any suitable technique such as the known saponification of an ethylene vinyl acetate copolymer. Ethylene vinyl alcohol copolymers are available commercially from EVALCA, for example, an F101 grade EVOH, and any desirable EVOH copolymer can be used having sufficient oxygen barrier properties. Blends of EVOH with other polymers such as polyethylene and any needed compatibilizing agent may also be used in the barrier layer.

Preferably, the barrier layer comprises the barrier resin contained in one layer of a thermoplastic multi-layer barrier film. Any suitable multi-layer barrier film comprising the barrier resin can be used, and such barrier films generally contain one or more adhesive or tie layers. Other layers in such films add other properties to the film, such as moisture resistance or heat sealability. Techniques for producing such multi-layer barrier films are known to those skilled in the art. Any suitable technique can be used to produce the film comprising the barrier resin. Preferably such a barrier film is produced by co-extrusion of the layers making up the barrier film.

The multi-layer barrier film used in the invention preferably comprises a layer of a polyolefin, such as polypropylene, or other moisture-resistant thermoplastic located on one surface of an EVOH layer of the film with an adhesive layer in between the polyolefin layer and the EVOH layer. In the preferred multi-layer sheet of the invention, on the other surface of the EVOH layer of the preferred film, is an adhesive layer adjacent the inner multi-resin layer (or the foam core layer in another embodiment of the invention). The preferred barrier film layer of the invention also has an outer surface layer of a thermoplastic selected for its heat-sealing properties for adhesion to an overwrap packaging film, adjacent the moisture-resistant thermoplastic or polyolefin. Any suitable thermoplastic such as linear low and low-density polyethylene can be used for the outer surface layer. Any suitable adhesive can be used in the tie layers in the barrier film layer, and the choice of an adhesive often depends on the particular resins in the barrier film. A preferred adhesive is ethylene vinyl acetate copolymer (EVA). Adhesives using EVA are commercially available. For the preferred sheet of the invention, the EVA used should have a vinyl acetate content of about 10 to about 15 weight percent of the EVA, since EVA with this vinyl acetate content provides adequate adhesion. Thus, the multi-layer barrier film used to form the barrier layer of the invention preferably comprises an outer surface layer of a linear low-density polyethylene (LLDPE), an inner layer of polypropylene (PP), an adhesive layer of EVA, then a layer of the EVOH barrier resin and finally another adhesive layer of EVA. In this preferred film, by weight percent of the film layer, preferably the LLDPE is 24.4 percent, the PP is 42.8 percent, the EVA is 16.5 percent and the EVOH is 16.5 percent.

The multi-resin layer or layers of the multi-layer sheet of the invention comprise the resins present in the foam core layer and the other layers of the multi-layer sheet of the invention and preferably comprise at least three thermoplastic resins: the polystyrene, the polyolefin and the EVOH barrier resin. It is also important that the reclaim material mixture has a minimum elongation at break of about 2.6 percent, as measured by ASTM D-638-1; reclaim material mixtures of these three resins having an elongation at break below about 2.6 percent when extrusion coated to produce the preferred thin multi-resin layer may result in a layer with cracks. Reclaim material derived from production of sheets of the invention containing the preferred barrier film described above comprises about 30 to about 87 percent polystyrene, about 0 to about 46 percent impact polystyrene, about 0 to about 10 percent ethylene vinyl alcohol copolymer, about 0 to about 15 percent ethylene vinyl acetate copolymer, about 0 to 20 percent polypropylene and about 0 to about 15 percent linear low-density polyethylene, with all percents by weight of reclaim. Applicants found that it was not necessary to add a compatibilizer to such reclaim material derived from the preferred sheet; this material could be fabricated into a layer without cracks or holes and with adequate adhesion to polystyrene foam.

The thermoplastic reclaim material can be from any source for a thermoplastic reclaim material comprising a barrier resin, and preferably is derived from: a) trim scrap from the production of the multi-layer sheet of the invention, b) multi-layer sheets of the invention which are declared as waste and not processible further, or c) scrap from the process used to fabricate end-use articles from the sheet. Scrap from the manufacture of the sheet of the invention or from fabrication of the sheet into articles is preferred for the multi-resin layer because it results in a manufacturing process with minimal or virtually no thermoplastic waste. The scrap reclaim material is recovered and processed by any suitable technique, such as by grinding and blending, from either or both of the multi-layer sheet production process and from any thermoforming or other subsequent processing of the multi-layer sheet.

During the production of the multi-layer sheet of the invention, the amount of scrap generated will generally reach a steady state level when total recycling of scrap produced from the sheet production is utilized. The steady state level, of course, will vary from operation to operation given the total amount of sheet material produced. Where the multi-layer sheets of the invention are processed or formed into articles at the sheet production site, the level of scrap generally will run in the range of about 40 percent to about 60 percent of the total amount of sheet produced. Where the sheets are not fabricated on-site, the level of scrap is generally about 5 to about 20 percent. These scrap levels of about 5 to about 60 percent are readily handled in the production of the reclaim-containing sheets of the invention.

The amount of scrap material generated during manufacture of the multi-layer sheet can, though need not, determine which embodiment of the multi-layer sheet is selected. For example, where the amount of scrap is large, sheets containing both inner and outer multi-resin reclaim layers can be produced to use up the scrap. Where lesser amounts of scrap are available, sheets containing only the inner reclaim layer can be produced.

Other, fresh resins can be added to the reclaim material to provide improved properties to the sheet. For example, in a multi-layer sheet of the invention comprising a polystyrene foam core, it is preferred to add a virgin impact polystyrene having an Izod impact strength, as measured by ASTM D-256, of about 0.5 to about 4.0 (an example of which is H2R, available from Amoco Chemical Company) to the reclaim material used in the multi-resin layer to improve its impact resistance, particularly for sheets with an outer multi-resin layer. Such a blend of reclaim material and impact polystyrene is generally in the range of about 1 percent impact polystyrene to about 25 percent impact polystyrene and about 75 percent reclaim material to about 99 percent reclaim material (the percents are by weight of total reclaim). Although it is not necessary to add an additional resin, such as the impact polystyrene, to the inner multi-resin layer, it is preferred to do so because this provides additional strength to the sheet and permits use of one feed source for extrusion coating of both the inner and outer multi-resin layers. Where fresh impact polystyrene is added to the reclaim material, some impact polystyrene is already present in the reclaim material and the overall impact polystyrene content in the multi-resin layer is about 1.0 percent to about 35.0 percent by weight.

The weight percent of each resin present in the mixture making up the multi-resin layer of course varies with the sheet being manufactured and the thicknesses of each layer in the sheet. Reclaim material recovered from manufacture of the preferred four layer sheet of FIG. 1, having a five layer barrier film layer of LLDPE/PP/EVA/EVOH/EVA and having fresh impact polystyrene in the multi-resin layers, comprises about 2.0 percent to about 5.0 percent EVOH, about 7.0 percent to about 12.0 percent polypropylene, about 4.0 percent to about 8.0 percent linear low-density polyethylene, about 3.0 percent to about 6.0 percent ethylene vinyl acetate, about 45.0 percent to about 55.0 percent polystyrene, and about 6.0 percent to about 10.0 percent impact polystyrene, with all percents on a by-weight basis.

The multi-layer sheets of the invention can be produced in any convenient thickness and generally are about 30 mils to about 210 mils thick, since sheets below 30 mils may lack sufficient rigidity and sheets above 210 mils cannot be easily thermoformed into packaging articles. The preferred four major layer sheet of FIG. 1 is in the range of about 48 mils to about 119 mils thick, since sheets of these thicknesses have sufficient strength and rigidity for packaging applications. The multi-resin reclaim layers 12 and 14 may be the same or different thickness and are preferably each in the range of about 1.0 mil to about 7.0 mils thick, because layers of these thicknesses are easily produced by extrusion coating and typically use all sheet scrap from the manufacturing process. More preferably, the multi-resin layers are about 2.0 to about 4.0 mils thick because it is easier to maintain thickness uniformity for this range of thickness. It was unexpected that the multi-resin reclaim layer containing a polystyrene, an EVOH barrier resin and a polyolefin and having a thickness of about 1.0 to about 7.0 mils could be extrusion coated onto a polystyrene foam core without the addition of a separate adhesive layer between the reclaim layer and the foam core because these three resins are incompatible and mixtures of them would not be expected to exhibit good adhesion to another thermoplastic layer. The thickness of the foam core layer may vary depending upon the requirements, for example, rigidity, of the end-use application of the sheet. Preferably, the foam core layer in the finished multi-layer sheet will be in the range of about 45 mils to about 100 mils thick. The barrier layer preferably comprises a film having an overall thickness of about 1 to about 5 mils and more preferably is about 3 mils, as multi-layer EVOH barrier films having adequate oxygen barrier properties can be prepared in these thicknesses.

The foam core reclaim multi-layer sheets of the invention are produced by a process preferably comprising extrusion coating the reclaim material onto each of the upper and lower surfaces of a plastic foam layer. The multi-layer sheets of the invention also may be produced by co-extrusion; however, process control limitations in the co-extrusion of a foam layer and a coating layer make obtaining commercial production rates with conventional co-extrusion equipment impractical. The extrusion coating of the multi-resin reclaim layers may be done with any known coating technique, and preferably is done using the method of U.S. Pat. No. 3,616,020. Hence, the reclaim material recovered from manufacturing operations is flaked and pelletized to a desirable size and is mixed with impact polystyrene in the desired amount to produce the reclaim material feed. The size of the reclaim material after the initial processing is not believed critical. The reclaim feed is then melted by heating to a temperature of about 350° F. to about 500° F. in the extruder and then coated in the desired thickness onto the foam core. The reclaim material used in the extrusion coating is also preferably processed to reduce solid content in the melted reclaim material stream. This is done to guard against solids present in the reclaim melt stream causing holes in the reclaim layer. Solids present in the reclaim melt can come from decomposition, cross-linking, gel formation or other reactions of resins present in the reclaim stream. The processing to reduce solids content can be accomplished by screening the melt through an appropriately sized screen, such as a screen located in the extruder, and/or by adding an additive, such as GF-20, available from EVALCA, to deactivate residual catalyst present in the reclaim which can decompose the EVOH.

Preferably the method further comprises laminating the barrier film layer onto one multi-resin layer to produce the preferred multi-layer foam core sheet of the invention. The barrier film layer can be laminated by any known method, such as by contacting an adhesive layer of the barrier film layer with the inner multi-resin layer or the foam core layer.

A more preferred method of the invention comprises extruding a polystyrene foam core layer having an upper and lower surface; extrusion coating a multi-resin reclaim layer having a thickness of about 1 to about 7 mils consisting essentially of ethylene vinyl alcohol copolymer, ethylene vinyl acetate copolymer, linear low-density polyethylene, polypropylene, polystyrene and impact polystyrene onto each of the upper and lower surfaces of the foam core layer to produce a foam core-reclaim sheet having a foam thickness about 45 to about 100 mils; and laminating a barrier film layer comprising layers of ethylene vinyl alcohol copolymer, ethylene vinyl acetate copolymer, linear low-density polyethylene, and polypropylene onto one multi-resin reclaim layer to produce a foam core multi-layer sheet.

Any suitable technique can be used to produce the foam core layer, the choice of which will vary depending upon the precise foam used. When using a polystyrene foam, it is preferred to produce the foam by conventional extrusion of an extrusion mass comprising polystyrene and suitable amounts of a physical blowing agent comprising an aliphatic hydrocarbon such as butane or propane and a nucleating agent such as talc.

Another embodiment of the method of the invention comprises an improvement in the foam extrusion step of the preferred method discussed above. In this embodiment, the reclaim material comprising the barrier resin is actually combined with the foam resin and the mixture of reclaim and foam resin is then foamed. This method is used preferably where the amount of reclaim material produced during the multi-layer sheet manufacturing process exceeds the amount which can be utilized in the reclaim layers. In this method, the amount of reclaim material added can be in the range of about 1 to about 40 weight percent of the foam resin. It was unexpected that a mixture of foam resin and the reclaim material comprising the barrier resin could be foamed to produce an acceptable foam.

In this embodiment, the reclaim material is flaked and pelletized and is mixed with the desired amount of the desired foam resin, such as one of those used to produce the foam core layer of the multi-layer sheet of the invention, and with any desired cell control or nucleating agent or with other desired additives, such as fire retardants, and is fed to an extruder. Any known blowing agent, for example, an aliphatic hydrocarbon such as propane or butane, $CO_2$, nitrogen or hydrochloroflourocarbons, which produces a stable foam having a desired cell size from the foam resin can be used to foam the reclaim material/foam resin blend. For producing foams used in packaging applications, a blowing agent comprising an aliphatic hydrocarbon is preferred. The amount of blowing agent by weight of the resin and reclaim feed can be any desirable amount and preferably is about 2.0 to about 12.0 weight percent.

For a reclaim material comprising EVOH, polypropylene, LLDPE, EVA, polystyrene and impact polystyrene mixed with polystyrene as the foam resin, the amount of added talc nucleating agent is about 0.5 to about 2.0 parts per 100 parts by weight resin plus reclaim, and the amount of blowing agent is about 2.0 to about 6.0 parts by weight per 100 parts by weight fresh resin plus reclaim. For this reclaim material and polystyrene mixture, a blowing agent comprising butane gives good results. It should be noted that foaming a mixture of reclaim material and a foam resin has applications besides the production of the sheet of the invention. Foam produced by foaming such a mixture may be used for other purposes, such as for insulation.

FIG. 2 is a drawing showing the more preferred method of the invention. Foam extruder 100 is shown producing a polystyrene foam by extrusion through an annular die. The extruded foam is then slit and flattened to produce a polystyrene foam core sheet 101 which is sent through tension control rollers 102 to extrusion nip rollers 104 and 105, for extrusion coating of multi-resin reclaim material from extruder 103 onto one layer of the foam core. The nip rollers 104 and 105 have a clearance between them, commonly referred to as the nip, which causes the reclaim material and the polystyrene foam core to be compressed. In practice, the nip pressure must be adequate to compress the reclaim layer into the foam core substrate. Such a pressure is that generally sufficient to compress the foam core layer to about one-half or more of its original thickness of about 80 to about 180 mils. The tension on the foam sheets during the extrusion coating steps should be carefully controlled to ensure a wrinkle-free product. The nip roller 105 is also chilled to cool the one-side coated sheet. The one-side coated foam core layer 106 is then sent to reverse rollers 107 and 108 in preparation for coating of the other side. It then goes to nip rollers 109 and 110 where an additional multi-resin reclaim layer from extruder 112 is coated on the other surface of the foam core sheet. The temperature and line speed conditions disclosed in U.S. Pat. Nos. 3,616,020 or 3,669,794, which are incorporated by reference, are used in the extrusion coating of the reclaim layers onto both surfaces of the foam core. For the preferred reclaim material comprising EVOH, ethylene vinyl acetate copolymer, polystyrene, impact polystyrene, polypropylene and linear low-density polyethylene, the extrusion temperature is about 350° F. to about 500° F. The line speeds attainable vary with sheet thickness and will be in the range of about 20 to about 100 feet per minute. For a 70 mil thick sheet, the line speed will be about 60 to about 70 feet per minute.

Next, a barrier film layer 114 comprising the barrier resin is taken from roll 113, through guide rollers 115, and is laminated onto the reclaim layer at nip rollers 109 and 110 to produce the multi-layer sheet 116 of the invention. Sheet 116 then passes through another nip between rollers 110 and 111 and then by guide rollers 117 to 123 to roll-up at rewind station 124. The last roller 123 is a pressure roller for maintaining tension on the sheet. The rolled sheet is then ready for shipment to another processing site or can be thermoformed or shaped into articles at the same location.

Applicants prefer the method shown in FIG. 2 involving film lamination of the barrier film layer to the reclaim-foam core sheet immediately after extrusion coating of the reclaim layer while the reclaim layer is still hot, over attempting to laminate a preheated barrier film layer to a preheated foam core sheet. In trials, Applicants had difficulty achieving sufficient lamination of the preferred barrier film layer of the invention to the foam core sheet using a three nip roller stack (such as rollers 109, 110 and 111) where the rollers were heated at 180° F. and before lamination the foam core sheet and the barrier film were at room temperature.

In the method of FIG. 2, Applicants found that, to achieve a wrinkle-free sheet 116 at commercially viable line speeds of about 60 to about 70 feet per minute, rollers 110 and 111 must be maintained at a temperature below about 150° F. and roller 109 should be in the range of about 80° F. to about 110° F. If the rollers are too hot, i.e., outside the above conditions, wrinkling of the film layer cannot be eliminated. Preferably, rollers 110 and 111 are maintained about 110° F. to about 135° F. The nip between rollers 109 and 110 and between rollers 110 and 111 is preferably about 30 to about 40 mils, and more preferably about 35 to about 38 mils to achieve good lamination.

In another embodiment, the method of the invention comprises initial production of a multi-layer sheet, which has no multi-resin layer or layers, until enough scrap is generated in the production method to be used to produce reclaim containing sheets. In this embodiment, a multi-layer sheet comprising: the preferred barrier film layer of the multi-resin layer sheet of FIG. 1, an inner layer of impact polystyrene adjacent the barrier film layer, a foam polystyrene core layer adjacent the inner layer, and an impact polystyrene outer layer adjacent the other surface of the foam core layer is produced initially by the method of FIG. 2. In the initially produced sheet the impact polystyrene inner and outer layers are extrusion coated in thicknesses of about 1.0 mil to about 7.0 mils onto the polystyrene foam sheet, in place of the inner and outer multi-resin layers, to produce the foam sheet and the barrier film layer is then laminated onto the foam sheet to produce a non-reclaim-containing multi-layer barrier foam sheet. When enough scrap is collected from the initial production steps, either or both the inner or outer impact polystyrene layer are replaced with a multiresin reclaim layer to produce a reclaim-foam sheet, and the barrier film layer is then laminated onto it to produce the reclaim-foam core multi-layer sheet. Furthermore, when scrap levels are depleted, production of the sheets without reclaim can be resumed. Thus, this embodiment provides great flexibility in disposal of scrap during manufacturing of multi-layer barrier sheets and results in a continuous production process of multi-layer foam barrier sheets, either with or without multi-resin reclaim layers.

The multi-layer sheets of the invention can be processed and shaped by any suitable process, and preferably by known thermoforming processes, to produce various articles, which will generally have bottom and side walls. Exemplary articles include trays, bowls and cups. The invention thus comprises articles produced from the multi-layer sheets of the invention, and such articles have particular application in the food packaging and medical packaging industries. Preferably, trays, cups and bowls used for food packaging or food contact are fabricated from the preferred multi-layer sheets of the invention so that the barrier film layer is the interior surface, i.e., the food contact surface, of the article.

The invention is described further in the following examples.

EXAMPLES 1-5

Three samples of different resin blends were prepared as follows. All percents (%) shown are weight percents. The resin blends simulated reclaim material from multi-layer sheets made with a five layer (LLDPE/PP/EVA/EVOH/EVA) barrier film.

Blend 1 was produced by compounding 500 lbs total of 50.1% crystal polystyrene (Amoco Chemical Company R1), 32.7% high impact polystyrene (Amoco Chemical Company H2R), 5.5% PP (7853-367 available from Eastman Kodak), 3.0% LLDPE (Dow Chemical 3010), 2.1% EVA (Plexar 3342 available from Chemplex), 1.6% EVOH (F101 grade available from EVALCA) and 5.0% Kraton G2701 (a styrene-ethyleneco-butylene-styrene block copolymer available from Shell) on a conventional ZSK-30 single screw extruder and extruding the compounded blend at a temperature of about 432° F. through a one hole die at 25 lb/hr initially and then through a two hole die at 45 lb/hr. Blend 1 simulates a reclaim from a multi-layer sheet manufacturing process to which a compatibilizing agent (Kraton) is added.

Blend 2 was produced by compounding 250 lbs. total of 63.1% crystal polystyrene, 21.6% impact polystyrene, 6.9% PP, 3.8% LLDPE, 2.6% EVA and 2.0% EVOH on the same extruder using the same resins and processing conditions as used to make Blend 1. Blend 2 simulates a reclaim from utilization of trim scraps from a multi-layer laminate manufacturing process.

Blend 3 was made by first extruding, at a temperature of 420° F., through an annular die, a mixture of polystyrene resin (Amoco R1), 4.0 parts butane per 100 parts resin and 1.0 parts talc per 100 parts resin, to produce a foam sheet having a density of 3.4 lbs/ft$^3$. The foam sheet was then extrusion coated on one surface with a 2 mil thick layer of impact polystyrene (Amoco H2R). A five layer LLDPE/PP/EVA/EVOH/EVA barrier film of 16.5 wt% EVA, 16.5 wt% EVOH, 42.8 wt% PP and 24.2 wt% LLDPE, made by co-extrusion of the resins of Blend 1, was then laminated onto the other surface of the foam sheet by passing through two nip rollers having a nip of about 35 mils. The foam layer was 70 mils thick after lamination. The barrier film-/foam sheet was flaked and pelletized, and extruded on an 8-inch Sterling extruder at a temperature of 440° F. to produce Blend 3, which simulates reclaim from complete recycle of a barrier layer/foam sheet. The composition of Blend 3, on a weight % basis, was 45.6% polystyrene, 30.8% impact polystyrene, 3.9% EVOH, 3.9% ethylene vinyl acetate, 10.1% polypropylene and 5.7% linear low-density polyethylene.

The mechanical properties of each Blend, for comparison to those of an Impact Polystyrene (IPS), are in Table 1. The IPS was extruded on a Brabender extruder at 285° F. As is seen in Table 1, the mechanical properties of each of the Blends were similar to those of the IPS control sample.

TABLE 1

| Property | Material | | | |
|---|---|---|---|---|
| | IPS | Blend 1 | Blend 2 | Blend 3 |
| ASTM D-648 Heat Deflection @ 66 psi | 201 | 199 | 199 | 228 |
| ASTM D-256 Izod Impact (ft-lb/in) | 1.2 | 0.8 | 0.4 | 0.4 |
| ASTM D-1822 Tensile Impact Strength (ft/lb/in$^2$) | 35 | 25 | 21 | 21 |
| ASTM D-790 Flex Modulus (mpsi) | 330 | 326 | 410 | 324 |
| ASTM D-638-1 Break Strength | 4.1 | 3.2 | 5.7 | 4.5 |
| % Elongation @ Break | 18.3 | 39.3 | 2.8 | 3.9 |

Heat deflection was measured by ASTM D-648; Izod Impact by ASTM D-256; Tensile Impact Strength ("TIS") by ASTM D-1822; Flex Modulus by ASTM D-790; and Break Strength and Elongation at Break by ASTM D-638-1.

Multi-layer sheets were prepared by extrusion coating each of the Blends and the IPS control onto a polystyrene foam sheet and then laminating a 3.0 mil thick, EVOH barrier film as used in Blend 3 onto the coated foam sheets in the following configurations:

Example 1: four major layers total-
Blend 1/Foam/Blend 1/Barrier Film
(The blend layers were each about 2.0 mils thick.)
Example 2: three major layers total-
Blend 1/Foam/Barrier Film
(The blend layer was about 2.0 mils thick.)
Example 3: four major layers total-
Blend 2/Foam/Blend 2/Barrier Film
(The blend layer was about 2.0 mils thick.)
Example 4: three major layers total-
Foam/Blend 3/Barrier Film
(The blend layer was about 2.5 mils thick.)
Example 5: four major layers total-
IPS/Foam/Blend 3/Barrier Film
(The IPS layer was about 2.5 mils thick, and the blend layer was 2.0 mils thick.)

The polystyrene foam layer in each case was produced by extruding on a 4½" to 6" NRM extruder, a mixture of Amoco R1 polystyrene, 4.0 parts butane per 100 parts by weight resin and 1.0 parts talc per 100 parts by weight resin through an annular die at 420° F.; the resulting foam was then slit to produce a foam sheet having a density of 3.4 lb/ft$^3$. The Blends and IPS layers were extrusion coated in the above thicknesses onto the foam core using a Johnson extruder to extrude the Blends at a temperature of about 440° F. The barrier film was laminated by passing the film and the rest of the structure through a stack of three nip rollers having a nip of about 35 mils. The top roller was at 110° F. and the middle and bottom rollers were at 130° F. In each case, the foam core was 70 mils thick.

The adhesion between the foam layer and the blend layers in each of Examples 1-5 and between the IPS and foam layer in Example 5 were measured by the method in ASTM D-229-82. The results are in Table 2.

TABLE 2

| Example | Adhesion (lb) |
|---|---|
| 1 | 0.71 |
| 2 | 0.71 |
| 3 | 0.22–0.45* |
| 4 | 0.47 |
| 5 | 0.42 (Blend), 0.38 (IPS) |

*Variation due to inadequate manufacturing process control.

As is seen by comparing the adhesions in Table 2, the adhesion of the multi-resin blend layers to the foam layer in Examples 3, 4 and 5 (each of which did not contain the Kraton compatibilizer) exceeded the adhesion of the IPS layer to the foam layer in Example 5. Thus, a blend comprising ethylene vinyl alcohol, polypropylene, polystyrene, impact polystyrene, ethylene vinyl acetate and linear low-density polyethylene can be adhered to a polystyrene foam core without an added adhesive layer and without adding a compatibilizing agent to the reclaim material.

The sheets from Examples 1-5 were each also thermoformed successfully into packaging trays, with the barrier film layer as the interior surface of the trays.

During some attempts at extrusion coating of the sheets of Examples 1-5, it was observed that holes were formed in the reclaim layer due to the presence of small solid particles, believed to be decomposed barrier resin, in the melt. Thus, production of the multi-layer, foam-multi-resin layer sheets of the invention, should involve processing of the reclaim, before extrusion coating onto the foam core, to remove solids from or prevent solid formation in the multi-resin mixture.

EXAMPLES 6-10

Extrusion feed samples of Blend 3 and polystyrene resin (Amoco Chemical R1) were prepared as set out in Table 2:

TABLE 2

| Example No. | Blend 3 (% by wt) | PS Resin (% by wt) |
|---|---|---|
| 6 (Control) | 0 | 100 |
| 7 | 10 | 90 |
| 8 | 20 | 80 |
| 9 | 30 | 70 |
| 10 | 40 | 60 |

Each of the feeds of Examples 6-10 were then mixed with 1.0 parts talc by weight per 100 parts feed and 4.0 parts by weight butane per 100 parts feed in a 4½" to 6" NRM extruder and extruded at a temperature of 440° F. through an annular die and then slit to form a foam sheet. The foam extrusions were performed at the following die pressures, in psi: Ex.6-1980, Ex.7-1953, Ex.8-

1943, Ex.9-1958, and Ex.10-1858. the extrusion run speeds were 68 ft/min for Ex.6 and 72 ft/min for Ex.7 through 10. The resulting foams were analyzed, and the results are in Table 3.

TABLE 3

| Example No. | Density (lb/ft³) | Thickness (mils) | Cell Size |
| --- | --- | --- | --- |
| 6 | 3.8 | 101 | 5.9 |
| 7 | 4.6 | 85 | 4.5 |
| 8 | 4.3 | 93 | 4.9 |
| 9 | 4.3 | 93 | 4.9 |
| 10 | 4.2 | 91 | 4.8 |

Each of the foams produced in Examples 7-10, from fresh resin-blend mixtures was acceptable and was comparable to that of the control foam of Example 6.

The foams produced were also successfully thermoformed into trays. The foam sheets of Ex.6-10 were each first extrusion coated with a 2 mil thick impact polystyrene (Amoco H2R) layer. The thermoforming of the coated sheets from each of Examples 6-10 was done under identical conditions with a conventional thermoforming process. The thermoforming conditions were: top zone-550° F., bottom zone-700° F., cycle time-7.0 seconds, and index length-22.0 inches.

The trays formed from sheets of foams made from higher levels of Blend 3 had greater shrinkage, with those from Example 10 (40% reclaim) having 25% shrinkage in both machine and transverse directions. However, no significant loss of properties were seen in any of the trays. The trays made from a blend of resins were as thick, as strong and as microwaveable as trays made without a blend of resins.

EXAMPLE 11

A mixture of Blend 3, 80% by weight, and impact polystyrene, 20% by weight (Amoco H2R), was extrusion coated onto a polystyrene sheet by extrusion at 440° F. onto a polystyrene foam sheet produced like the foam sheet produced in Example 6. The adhesion between the blend/impact polystyrene layer and the foam layer was measured as 0.34. This level of adhesion is sufficient to not require an adhesive layer added in between the foam layer and a blend layer which contains a fresh resin such as the impact polystyrene.

EXAMPLE 12

A Blend 4, simulating another reclaim mixture of resins, was made using the same resins and the same procedure used to make Blends 1-3 and had the following composition by weight percent of the Blend:

| | |
| --- | --- |
| 61.2% | PS |
| 21.0% | IPS |
| 6.7% | PP |
| 3.7% | LLDPE |
| 2.5% | EVA |
| 1.9% | EVOH |
| 3.0% | GF-20 |

Blend 4 was then coated onto a foam core sheet like those used in Examples 1-5. However, after coating, the outer layer comprising Blend 4 showed cracks and had a marginal appearance, which is unacceptable for packaging applications.

The mechanical properties of Blend 4 were measured. Blend 4 had an elongation at break, measured by ASTM D-256, of 2.6%, which was the lowest elongation at break of any of the Blends examined. Because of the unacceptable performance of Blend 4 compared to that of Blend 2, having an elongation at break of 2.8%, the reclaim material mixture used preferably has an elongation at break above about 2.6%. Although mechanical properties other than elongation at break can be correlated with blend compositions, none of the other mechanical properties appear to correlate with extrusion capability.

EXAMPLE 13

A four major layer sheet as in FIG. 1 and 52.5 inches wide was made with the method of FIG. 2 wherein: layer 11 was the five-layer barrier film layer of Examples 1-5, inner layer 12 was a multi-resin blend impact polystyrene mixture as in Example 11, layer 13 was a polystyrene foam layer as in Example 11, and outer layer 14 was an impact polystyrene layer as in Example 5. In the final sheet, the barrier film layer 11 was 3 mils thick; the IPS/blend inner layer 12 and the IPS outer layer 14 were each 2.5 mils thick; and the polystyrene foam layer 13 was 62 mils thick (the foam layer was 100 mils thick after its extrusion and before coating). The line speed was about 60 ft/min. The IPS/blend and IPS layers were extrusion coated at a temperature of 440° F. Roller 109 was at a temperature of 100° F., and rollers 110 and 111 were at 130° F. The tension rollers were at settings adjusted to the line speed. The sheet produced was wrinkle-free and was thermoformed successfully into packaging trays, having the barrier layer as the contact surface for the packaging content, using conventional thermoforming apparatus.

The above description is intended as illustrative and not limiting, and the invention is further described by the following claims.

We claim:
1. A thermoplastic multi-layer sheet comprising:
 (a) a thermoplastic foam core layer; and
 (b) a multi-resin layer adjacent the foam core layer comprising a mixture of at least three resins which comprises a barrier resin selected from the group consisting of copolymers of ethylene and vinyl alcohol and polymers comprising a copolymer of acrylonitrile.
2. A thermoplastic multi-layer sheet comprising:
 (a) a styrenic resin foam core layer;
 (b) a multi-resin layer adjacent the foam core layer comprising a mixture of a styrenic resin, a polyolefin and an ethylene vinyl alcohol copolymer; and
 (c) an oxygen barrier layer comprising the ethylene vinyl alcohol copolymer.
3. The sheet of claim 2 wherein the multi-resin layer is one outer layer and the oxygen barrier layer is a second outer layer, and further comprising:
 (a) an inner multi-resin layer comprising a second mixture of at least three resins, which is located between the foam core layer and the oxygen barrier layer.
4. The sheet of claim 2 wherein the mixture comprises thermoplastic scrap derived from manufacturing or processing of the multi-layer sheet.
5. The sheet of claim 3 wherein the inner multi-resin layer and the outer multi-resin layer have the same composition and comprise thermoplastic scrap derived from manufacturing or processing of the multi-layering sheet.

6. The sheet of claim 3 wherein the oxygen barrier layer comprises ethylene vinyl alcohol copolymer, polypropylene and linear low-density polyethylene.

7. The sheet of claim 3 wherein the styrenic resin in the foam core layer and the outer multi-resin layer is polystyrene.

8. The sheet of claim 2 wherein the multi-resin layer is about 1.0 mil to about 7.0 mils thick.

9. The sheet of claim 3 wherein the outer multi-resin layer and the inner multi-resin layer are each about 1.0 mil thick to about 7.0 mils thick.

10. The sheet of claim 5 wherein the oxygen barrier layer is about 1.0 mil thick to about 5.0 mils thick.

11. The sheet of claim 5 wherein the outer multi-resin layer and the inner multi-resin layer are each about 1.0 mil thick to about 7.0 mils thick.

12. The sheet of claim 3 further comprising the adhesive layer between eh inner multi-resin layer and the outer oxygen barrier layer.

13. The sheet of claim 2 wherein the multi-resin layer comprises polystyrene and impact polystyrene.

14. The sheet of claim 3 wherein at least one of the inner and outer multi-resin layers comprises impact polystyrene.

15. The sheet of claim 14 wherein the impact-resistant polystyrene is unused before its addition to a reclaim mixture.

16. An article having a side wall and a bottom wherein the side wall and the bottom comprise a multi-layer structure comprising: a styrenic foam core layer, outer and inner reclaim layers comprising thermoplastic scrap obtained from manufacture of the multi-layer structure, and an outer barrier layer comprising ethylene vinyl alcohol copolymer.

17. The sheet of claim 5 wherein the thermoplastic scrap has an elongation at break of at least about 2.6 percent, as measured by ASTM D-638-1.

18. The sheet of claim 17 wherein the barrier layer comprises ethylene vinyl alcohol copolymer, polypropylene and linear low-density polyethylene.

19. The sheet of claim 17 wherein the foam core layer comprises polystyrene.

20. The sheet of claim 17 further comprising an adhesive layer between the inner multi-resin layer and the outer barrier layer.

21. The sheet of claim 18 wherein at least one of the multi-resin layers comprises at least three thermoplastic resins.

22. The sheet of claim 21 wherein at least one of the multi-resin layers comprises fresh, impact-resistant polystyrene.

23. The sheet of claim 1 consisting essentially of a thermoplastic foam layer, a multi-resin layer comprising at least three resins which comprises a copolymer of ethylene and vinyl alcohol, and an oxygen barrier layer comprising a copolymer of ethylene and vinyl alcohol.

24. The sheet of claim 1 wherein the foam core layer comprises a styrenic resin and an ethylene vinyl alcohol copolymer.

* * * * *